Figure 1:
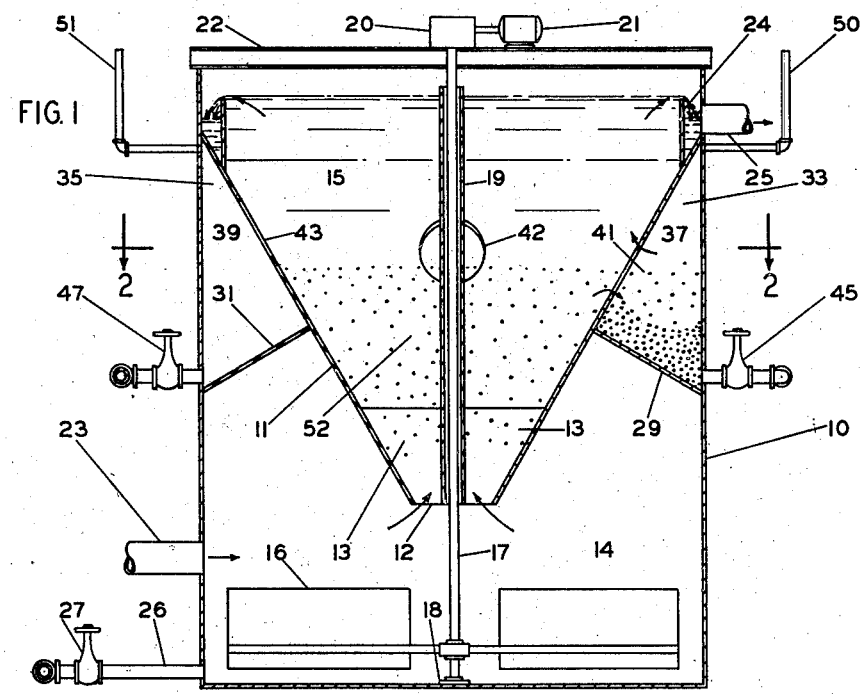

Jan. 9, 1945.  W. B. GURNEY  2,366,898

LIQUID TREATING APPARATUS

Filed Dec. 16, 1939

INVENTOR:
WILLIAM BREWSTER GURNEY
BY
ATTORNEY

Patented Jan. 9, 1945

2,366,898

UNITED STATES PATENT OFFICE 2,366,898

LIQUID TREATING APPARATUS

William Brewster Gurney, Baton Rouge, La., assignor to The Permutit Company, New York, N. Y., a corporation of Delaware Application December 16, 1939, Serial No. 309,549

8 Claims. (Cl. 210—16)

This invention relates to liquid treating apparatus; and it comprises, in combination, a coagulating vessel, means for supplying liquid to be treated and liquid treating reagent to the coagulating vessel, means for agitating the liquid and reagent, a precipitating vessel in communication with the coagulating vessel, means for withdrawing treated liquid from the precipitating vessel, and means for withdrawing sludge from the precipitating vessel and returning clarified liquid thereto; all as more fully described hereinafter and as claimed.

This invention is an improvement on liquid treating apparatus of the general type disclosed in the Spaulding Patent No. 2,021,672 dated Nov. 19, 1935, wherein liquid to be treated and liquid treating reagent are passed into a coagulating vessel, mixed and agitated therein and the mixture is then passed upwardly at decreasing velocity through a precipitating vessel wherein a sludge filter is maintained which aids the precipitation and separation of matter to be removed from the liquid, clear treated liquid being withdrawn from the upper portion of the precipitating vessel. The precipitated matter is withdrawn from the coagulating vessel, either as a continuous small stream or intermittently. The sludge thus withdrawn usually has a concentration of the order of 2 percent of solid matter. Thus, the sludge represents a large bulk the disposal of which not only is troublesome at times but which also involves considerable waste of the liquid being treated. This sludge may be concentrated by allowing it to stand in a sedimentation space wherein the sludge concentrates so that the sludge may be withdrawn from the bottom of the sedimentation space in more concentrated form and the relatively clear liquid remaining in the top portion of the sedimentation space may be returned to use, after further clarification if necessary. If such utilization of the liquid separated by sedimentation is desired, however, it is necessary to repump the liquid to a point of use.

The objects of my invention are, first, to provide in an apparatus of the aforementioned type a chamber for concentrating and removing sludge without occupying additional floor space and by merely utilizing certain portions of the apparatus not required in the normal process of treating the liquid; secondly, to make provisions for returning the liquid freed of sludge to the liquid being treated without any need for repumping; and, thirdly, to arrange the sludge removal means in such manner that an effective sludge filter is maintained in the apparatus.

The manner in which the foregoing objects are achieved is shown in the appended drawing in which—

Figure 2:
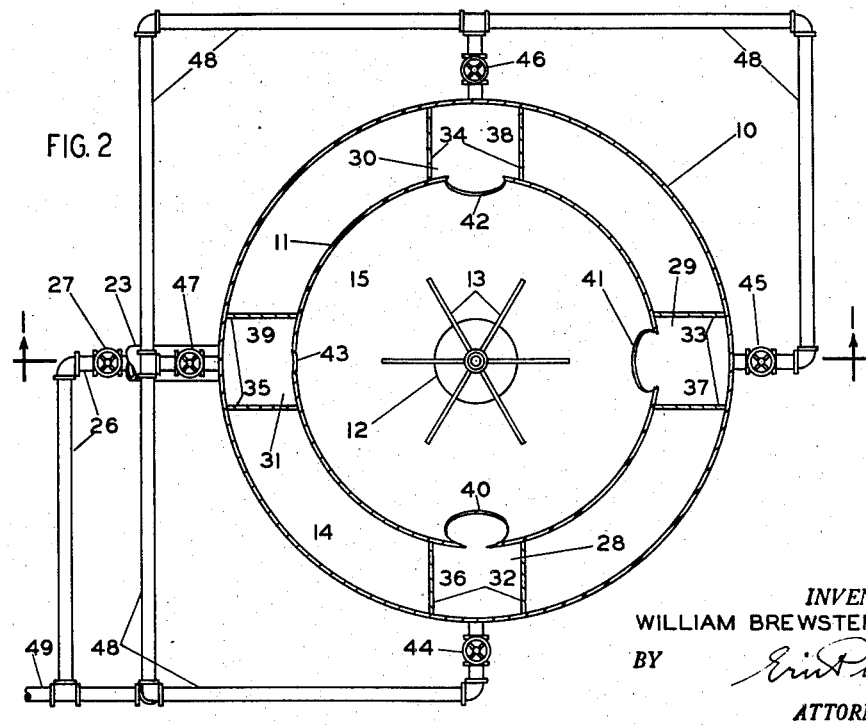

Fig. 1 is an elevation of an apparatus according to my invention, in cross-section along line 1—1 of Fig. 2; and Fig. 2 is a plan view in cross-section taken along line 2—2 of Fig. 1.

Similar reference characters refer to similar parts throughout both views.

The apparatus comprises a cylindrical tank 10 with a funnel-shaped partition 11 having an opening 12 at its lowermost point and provided with radial baffles 13 adjacent the opening 12. The partition 11 divides the tank into a lower coagulating vessel 14 and an upper precipitating vessel 15. Within the coagulating vessel 14 is an agitator 16 mounted on a vertical shaft 17 which is arranged to rotate in bearing 18 and which is encased in a protecting tube 19. The shaft 17 is rotated through a gear reduction 20 by means of a motor 21 mounted on beams 22 on top of the tank. An inlet 23 for liquid and liquid treating chemical is connected with the coagulating vessel 14. Within the precipitating vessel 15 and near its top is an annular weir 24 which is adapted to discharge into an outlet pipe 25. The coagulating vessel is provided near its bottom with a sludge outlet 26 fitted with a valve 27.

Extending between the tank 10 and the partition 11 are partitions 28, 29, 30 and 31 with upwardly extending sides 32, 33, 34 and 35, respectively, which thus form the respective chambers 36, 37, 38 and 39. Each of these chambers is in communication with the precipitating vessel 15 through one of the respective openings 40, 41, 42 and 43. These openings provide passages through the partition 11 and, as shown in the drawing, the openings are arranged at different elevations. The chambers 36, 37, 38 and 39 are provided in their lower portions with respective valved outlets 44, 45, 46 and 47 all of which outlets are connected to a common header 48. The sludge outlet 26 and the header 48 are joined to a common sludge outlet 49 leading to a point of disposal. Each sludge concentration chamber is advantageously provided with a vent as shown at 50 and 51 (Fig. 1) for chambers 37 and 39, respectively.

In operation of the apparatus shown in Figs. 1 and 2 liquid and liquid treating chemical are passed through inlet 23 into the coagulating vessel 14 where they are mixed and agitated by means of the rotating agitator 16. The liquid then flows upwardly through opening 12 past baffles 13 into the precipitating vessel 15. During its upward flow in the precipitating vessel the velocity decreases. In the lower part of the precipitating vessel the velocity is sufficiently high to maintain a substantial portion of precipitates in suspension forming a sludge filter 52 which aids the precipitation and separation of matter to be removed from the liquid. Beyond a certain level in the precipitating vessel the velocity no longer is able to suspend precipitates and clear treated liquid rises to the top of the precipitating vessel, flowing over the weir 24 to outlet 25. In Fig. 1 a sludge filter 52 is shown which reaches up to openings 40, 41 and 42 but does not reach to opening 43. Consequently, sludge overflows through openings 40, 41 and 42 into the sludge concentration chambers 36, 37 and 38 where in the absence of any appreciable velocity, vertical or otherwise, the sludge concentrates at the bottom whereas the lighter relatively clear liquid returns through the upper portion of the respective openings 40, 41 and 42 to the precipitating vessel 15, thus being returned to use. From the sludge concentration chambers 36, 37 and 38 the concentrated sludge is removed, either intermittently or continuously, by means of valved outlets 44, 45 and 46 and discharges through header 48 and outlet 49 to a point of disposal.

Normally the concentration of precipitates within the coagulating vessel 14 and in the sludge filter 52 within the precipitating vessel 15 is of the order of 2 percent and this concentration is increased to 10 percent or more in the sludge concentration chambers. This increase in concentration reduces the bulk of the sludge to about one-fifth or less which facilitates disposal and prevents the waste of a relatively large quantity of liquid.

At low rates of flow through the apparatus the top of the sludge filter is usually relatively low and in that case only the lower opening 40 may be in communication with the sludge filter. Thus, only one sludge concentration chamber is in operation. At high rates of flow through the apparatus, on the other hand, the level of the sludge filter rises above opening 43 and then all four sludge concentration chambers are in operation.

In liquid treating apparatus of the type referred to herein it is important that sufficient precipitated matter is retained to form an effective sludge filter. When sludge is removed only from the lower portion of the coagulating vessel an operator may readily remove too much sludge, thus interfering with effective operation of the entire apparatus. With the provision of my sludge concentration chambers excessive quantities of sludge are not easily withdrawn, since, as soon as sufficient sludge has been removed to drop the top of the sludge filter to the lowest opening leading into the sludge concentration chambers, no more sludge can enter the chambers, and only relatively clear liquid is removed by opening the valved sludge outlets; this, of course, entails a loss of liquid but does not interfere with effective liquid treating performance. With openings arranged at different elevations, as shown, the operator is enabled to maintain a relatively deep sludge filter at all times, if he so desires, by removing sludge only from the sludge concentration chamber or chambers communicating with the uppermost opening or openings.

Some particles of precipitates are so large that they are not maintained in suspension in the sludge filter 52 and drop into the coagulating vessel 14. At appropriate intervals of time such accumulated large particles as well as sand grains or the like trapped in the coagulating vessel may be removed by opening valve 27 in outlet 26 for a suitable interval of time. The outlet 26 is also useful for draining the entire apparatus for purposes of cleaning or repair.

An apparatus in accordance with my invention is particularly useful in the softening of water by the addition of lime but it may, of course, be used for other liquids and other types of treatment involving precipitation of dissolved matter or coagulation and removal of suspended matter. A type of sludge concentration chamber coming within the scope of my invention has been illustrated and described, but not basically claimed, in a co-pending patent of James M. Montgomery and William W. Aultman, No. 2,264,139 dated Nov. 25, 1941. Other modifications of the sludge withdrawal means shown and described herein will occur to those skilled in the art without departing from the spirit of my invention, and reference is therefore made to the following claims for a definition of the scope of my invention.

What I claim is:

1. In apparatus for treating liquid having a coagulating vessel, means for supplying liquid to be treated and liquid treating reagent to the coagulating vessel, means for agitating the liquid and reagent, a precipitating vessel in communication with the coagulating vessel, and means for withdrawing treated liquid from the precipitating vessel, improved means for concentrating and removing sludge which comprises a sludge concentration chamber alongside the precipitating vessel, a common wall for the sludge concentration chamber and the precipitating vessel, passage means interconnecting the upper portion of the sludge concentration chamber and the precipitating vessel, and means for withdrawing concentrated sludge from the sludge concentration chamber.

2. In apparatus for treating liquid comprising a tank having a side-wall, a sloping partition dividing the tank into a coagulating vessel and a superimposed precipitating vessel, means for supplying liquid to be treated and liquid treating reagent to the coagulating vessel, means for agitating the liquid and reagent, and means for withdrawing treated liquid from the precipitating vessel, improved means for concentrating and removing sludge from the precipitating vessel which comprises wall means extending from the side wall to the sloping partition, a sludge concentration chamber enclosed by said wall means, a portion of the side wall and a portion of the sloping partition, a passage interconnecting the sludge concentration chamber and the precipitating vessel, and means for withdrawing concentrated sludge from the sludge concentration chamber.

3. In apparatus for treating liquid having a coagulating vessel, means for supplying liquid to be treated and liquid treating reagent to the coagulating vessel, means for agitating the liquid and reagent, a precipitating vessel in communication with the coagulating vessel, and means for withdrawing treated liquid from the precipitating vessel, improved means for concentrating and removing sludge which comprises a plurality of sludge concentration chambers directly adjoining the precipitating vessel, means for withdrawing concentrated sludge from each sludge concentration chamber, and a passage interconnecting the upper portion of each of the sludge concentration chambers with the precipitating vessel, said passages opening into the precipitating vessel at different elevations intermediate the upper and lower ends of the precipitating vessel.

4. Apparatus for purifying liquids comprising a tank, an inclined wall structure in said tank defining an upper clarifying zone, a mixing zone in said tank below said clarifying zone, the lower end of said wall structure being open to said lower mixing zone and the inclination of said wall structure providing a passage of continuously increasing cross sectional area for the ascent of liquid in said clarifying zone, in which clarifying zone there is suspended by the ascending velocity of the liquid a substantial sludge mass for clarifying the liquid passing therethrough and having a definite upper level through which clarified liquid emerges, means connected with said inclined wall structure to form a pocket in said tank in communication with said clarifying zone at a height at least equal to but not below the minimum sludge level it is desired to maintain in said clarifying zone for receiving sludge from said last mentioned zone, an outlet from the lower portion of said pocket, means for supplying liquid to be treated and a chemical reagent to the mixing zone, mechanical rotary means in the mixing zone for agitating liquid therein, and an outlet for removing purified liquid from the upper portion of the clarifying zone.

5. Apparatus of the type described comprising a tank, an inclined wall structure in said tank dividing said tank into a lower mixing zone and an upwardly expanding clarification zone having a lower inflow communication with said mixing zone, an agitator mounted in said mixing zone, partition means extending from and connected with a portion of said inclined wall structure spaced above the bottom of said inclined wall structure and above said inflow communication and cooperating with said inclined wall structure to form walls of a sludge receiving pocket, said sludge receiving pocket walls having an opening from said pocket to said clarification zone at a substantial height above said inflow communication, and said sludge receiving pocket walls extending downwardly below said opening, and a discharge member extending from a portion of said sludge receiving pocket below said opening.

6. Apparatus for purifying liquids comprising a tank, an inclined wall structure in said tank secured thereto and spaced from the bottom thereof defining an upper clarifying zone and a lower mixing zone and a passageway between said zones at the lower end of said wall structure, the inclination of said wall structure being such that the cross-sectional area of said clarifying zone gradually increases from the bottom to substantially the top thereof, means attached to said wall structure above the lower end thereof to form a pocket in said tank in direct communication with said clarifying zone at a region spaced entirely above said lower end a distance equal to at least one third the vertical distance between the lower and upper ends of said structure, an outlet from the lower portion of said pocket, means for delivering liquid to be purified and a chemical reagent to the mixing zone, mechanical rotary means in the mixing zone for agitating liquid therein, and an outlet for removing purified liquid from the upper portion of the clarifying zone.

7. Apparatus for purifying liquids comprising a tank, an inclined wall structure in said tank spaced from the bottom thereof dividing said tank into an upper clarifying zone whose horizontal cross-sectional area gradually increases from the bottom to substantially the top thereof and a lower mixing zone, an opening at the lower end of said wall structure through which the clarifying and mixing zones communicate, means spaced above the lower end of said structure and attached thereto to form a pocket in said tank in direct communication with said clarifying zone at a region above but not below a horizontal plane midway between the upper and lower ends of said structure, an outlet from the lower portion of said pocket, means for delivering liquid to be purified and chemical reagent to the mixing zone, mechanical rotary means in the mixing zone for agitating liquid therein, and an outlet for removing purified liquid from the upper portion of the clarifying zone.

8. Apparatus for purifying liquids comprising a tank, an inverted frustro-conical baffle suspended in the tank and spaced from the bottom thereof dividing said tank into an upper clarifying zone and a lower mixing zone, an opening at the lower end of said baffle through which the clarifying and mixing zones communicate, means entirely within the tank spaced from the lower end of said baffle and attached thereto forming a pocket in direct communication with the clarifying zone, only above a horizontal plane spaced from the lower end of the baffle a distance equal to at least one-third the vertical distance between the lower and upper ends of said baffle, an outlet from the lower portion of said pocket, means for delivering liquid to be purified and a chemical reagent to the mixing zone, a mechanical rotary agitating means in the mixing zone for agitating liquid therein, and an outlet for removing purified liquid from the upper portion of the clarifying zone.

WILLIAM BREWSTER GURNEY.